Figure 1:
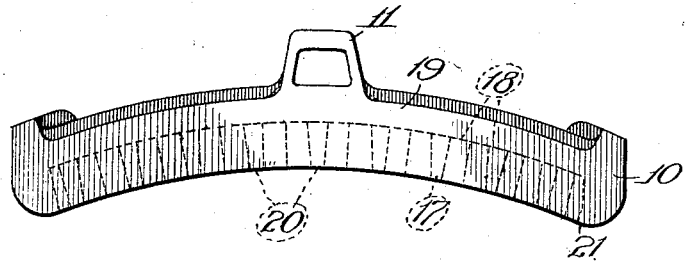

A. L. STREETER.
PROCESS OF MAKING BRAKE SHOES.
APPLICATION FILED NOV. 9, 1910.

1,118,160.

Patented Nov. 24, 1914.

UNITED STATES PATENT OFFICE.

ALFRED L. STREETER, OF CHICAGO, ILLINOIS, ASSIGNOR OF ONE-HALF TO ILLINOIS MALLEABLE IRON COMPANY, OF CHICAGO, ILLINOIS, A CORPORATION OF ILLINOIS.

PROCESS OF MAKING BRAKE-SHOES.

1,118,160.	Specification of Letters Patent.	Patented Nov. 24, 1914.

Original application filed July 25, 1910, Serial No. 573,658. Divided and this application filed November 9. 1910. Serial No. 591,523.

*To all whom it may concern:*

Be it known that I, ALFRED L. STREETER, a citizen of the United States, and a resident of Chicago, in the State of Illinois, have invented certain new and useful Improvements in Processes of Making Brake-Shoes, of which the following is a specification.

My present invention relates to brake shoes and contemplates, first, the provision of an improved construction of brake shoe, which comprises the subject matter of Letters Patent No. 981896, issued January 17, 1911, upon my copending application Serial No. 573658, filed July 25, 1910, of which this is a division, and, second, the provision of an improved process for making said brake shoe.

The brake shoe made according to my improved process and containing my improvements comprises essentially a metal body portion, a wearing insert of harder metal than said body portion, a suitable means for attaching the brake shoe to the brake head, all of the general form and appearance of a number of different types of shoes made according to present accepted Master Car Builders' standards for freight and passenger car service, though it is obvious that my improvements may be utilized for the production of locomotive driver shoes, street car shoes and other brake blocks of divers forms and contours.

The principal objects of my present invention are the provision of an improved type of brake shoe having a ductile metal back and in addition thereto a ductile metal body portion better enabled to withstand the shocks of service, and to accommodate itself to distortion of the brake head with which it is used, without fracture and consequent dropping of any portions of the shoe upon the track, thereby not only lessening the braking efficiency of the shoe but also giving rise to possible derailment of the car, than others known to me; the provision of an improved form of brake shoe wherein the ductile metal back and body portions thoroughly embrace the relatively rigid insert, and in the event of breakage prevent any portion of the insert from becoming disengaged from the body portion of the shoe and falling upon the track; the provision of an improved brake shoe comprising in combination a malleable body portion and a less malleable insert; the provision of an improved brake shoe especially adapted for use upon steel tired wheels and wheels having specially hard tread portions, such as the Davis manganese steel wheel; the provision of an improved process for making brake shoes characterized as above, together with such other objects as may hereinafter appear.

In the brake shoe practice carried on at this day, (as known to me,) no shoe has thus far been produced which is both adequately strong to meet service conditions and at the same time of sufficient braking quality for satisfactory use with wheels having tread portions of steel or other extraordinarily hard material, without scoring or grooving such treads, which is objectionable in this that such interruption of the continuity of the tread leads to breakage if not promptly removed by dressing, and that dressing of such hard material is both difficult and expensive.

In the attainment of the objects above stated, and in overcoming the disadvantages noted, I have provided a shoe, one embodiment of which is illustrated in the accompanying drawing, wherein—

Figure 2:
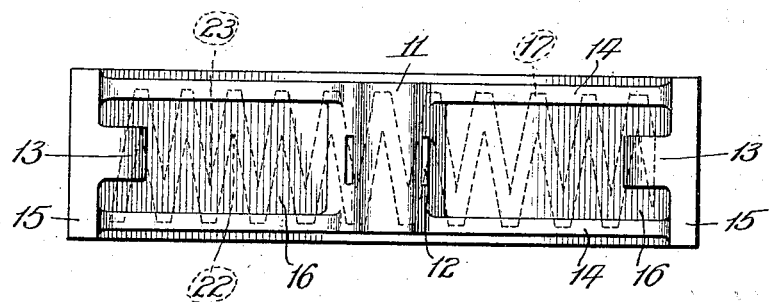

Figure 1 is a side elevation of the shoe; Fig. 2 is a view of the back of the shoe; and Fig. 3 is a perspective view of one form of insert which I preferably use in connection therewith.

Referring first to Figs. 1 and 2, it will be observed that the shoe here shown comprises a body portion, 10, having formed integrally therewith an attaching lug, 11, having keyway, 12 (Fig. 2) adapted to receive the attaching key by means of which the shoe is fixed to the brake head, the bifurcated ends of which embrace the end lugs, 13—13. On either side of the lug, 11, and extending laterally to within, say, three-quarters of an inch of the sides, 14—14, of the shoe and longitudinally to within about one inch of the ends, 15—15, thereof, I provide recess, 16—16, in the back, such recess having a depth of about five-sixteenths of an inch, to the end that when the shoe is fully worn out and must be discarded there will be a minimum amount of scrap remaining, and thus the largest possible percentage of the metal of the body of the shoe will be utilized, rendering the shoe highly economical in service.

Figure 3:
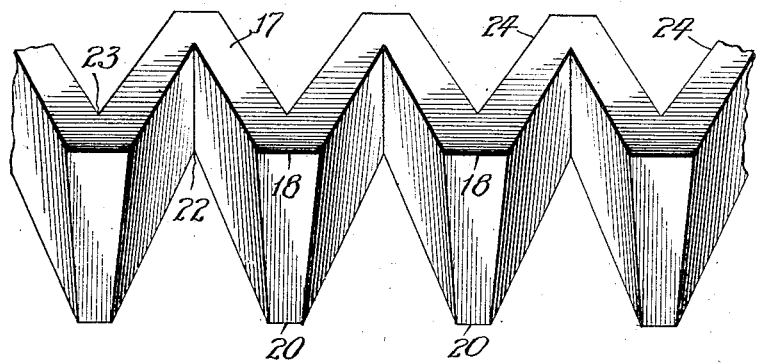

Referring now more particularly to Fig. 3, it will be observed that the insert, 17, (shown in dotted lines in Figs. 1 and 2) extends from the tread about two-thirds of the way to the back of the shoe and throughout substantially the entire length of the shoe (as indicated in the dotted lines in Fig. 1). As is clearly to be seen from Figs. 1 and 2, the insert is perceptibly greater in cross section at its upper portions, 18, adjacent the back, 19, of the shoe than it is at its lower portions, 20, adjacent the tread, 21, of the shoe, this construction being provided for the purpose of preventing the insert from becoming disengaged with the body in the event of fracture either of the body or back. For a like reason the insert, 17, is provided with a number of deep corrugations or indentations, 22 and 23, thus giving it the appearance of a number of jointed or continuous V-shaped portions, 24. As is clearly to be seen from Figs. 1 and 2, the body, 10, back 19, and lug, 11, are made of one integral casting, such cast metal being any one of a number of well known compositions of annealable iron, whereas the insert, 17, of wrought iron or mild steel plate but here shown as a casting is preferably made of iron of a composition which is less annealable than that of the body of the shoe, even to iron which is substantially non-annealable.

In practising my invention according to my preferred procedure, I provide an insert 17 made of relatively non-annealable material, preferably by the use of cast iron that is relatively low in silicon content, on account of which practically all of the carbon in the iron is in the form known as combined, and since, when this combined condition is present, the iron is white and not annealable at the degree of heat usually provided for annealing the iron commonly used for making malleable castings; the insert 17 is then placed in inverted position in a mold and the body 10 is then poured, embracing the insert 17, and, when desired, an attaching lug 11, integral with the body 10 is formed, the metal used in forming the body 10 being preferably of iron relatively high in silicon content, so that it is, relatively to the insert, quite readily annealable; and finally, for malleableization, the shoe is placed in an annealing furnace and treated with heat of a degree insufficient to anneal the insert, but adequate to anneal the body, and, desirably, render it malleable.

By carrying out my approved practice above described, I am enabled to produce a shoe wherein the wear retarding, and, if sufficiently hard iron has been used in its manufacture, the wear resisting and abrasive, qualities of the insert remain substantially unimpaired, whereas, on the other hand, the body has become not alone annealed and malleableized, but softened, to an extent desirable not only to avoid fracture under the bending moments met in service but also to gain a high degree of braking power.

A shoe is thus produced which has a combined lug, back and body portion of exceedingly tough metal which will readily accommodate itself to the brake head with which it is used, and at the same time containing a much less annealed, even to the extent of substantially non-annealed insert, of greater wearing capacity. It is obvious that the form of the insert and the degree of annealing to which it is subjected may be substantially modified without departure from the spirit of my invention, and that I do not limit myself to any particular composition of malleable iron for the body portion, nor of less annealable iron for the insert.

Having thus described my invention and illustrated its use, what I claim as new and desire to secure by Letters Patent is the following:

1. The process of making brake shoes which consists in casting a body of metal about a metal insert, one of annealable metal of relatively high braking power and the other of relatively non-annealable metal, and subsequently malleableizing the annealable member.

2. The process of making brake shoes which consists in casting a normally relative unannealable insert of extremely low silicon iron greater in cross section at its upper portions at the back than at its lower portions adjacent the tread and casting the body of the shoe about such insert.

In testimony whereof I have hereunto signed my name in the presence of the two subscribed witnesses.

ALFRED L. STREETER.

Witnesses:
PAUL CARPENTER,
EVELYN C. NAYLOR.